United States Patent
Leiber et al.

(10) Patent No.: US 11,584,348 B2
(45) Date of Patent: Feb. 21, 2023

(54) PRESSURE BUILD-UP CONTROLLED BRAKE SYSTEM WITH SPECIFIC INTERCONNECTION OF INLET VALVES WITH BRAKE CIRCUIT/WHEEL BRAKES AND METHOD FOR CONTROLLING PRESSURE

(71) Applicant: IPGATE AG, Pfäffikon (CH)

(72) Inventors: Heinz Leiber, Oberriexingen (DE); Thomas Leiber, Munich (DE); Anton Van Zanten, Ditzingen (DE)

(73) Assignee: IPGATE AG, Pfäffikon (CH)

( * ) Notice: Subject to any disclaimer, the term of this patent is extended or adjusted under 35 U.S.C. 154(b) by 31 days.

(21) Appl. No.: 15/558,438

(22) PCT Filed: Dec. 30, 2015

(86) PCT No.: PCT/EP2015/081403
§ 371 (c)(1),
(2) Date: Jan. 22, 2018

(87) PCT Pub. No.: WO2016/146224
PCT Pub. Date: Sep. 22, 2016

(65) Prior Publication Data
US 2018/0312153 A1    Nov. 1, 2018

(30) Foreign Application Priority Data

Mar. 16, 2015 (DE) .................... 20 2015 107 072.1
Mar. 16, 2015 (DE) .................... 20 2015 107 075.6
Mar. 16, 2015 (DE) .................... 20 2015 107 079.9

(51) Int. Cl.
*B60T 8/34* (2006.01)
*B60T 13/74* (2006.01)
(Continued)

(52) U.S. Cl.
CPC ............ *B60T 13/745* (2013.01); *B60T 7/042* (2013.01); *B60T 8/326* (2013.01); *B60T 8/4081* (2013.01);
(Continued)

(58) Field of Classification Search
CPC ...... B60T 8/341; B60T 8/3615; B60T 8/3655; B60T 8/366; B60T 8/3665; B60T 8/367; B60T 8/5006
See application file for complete search history.

(56) References Cited

U.S. PATENT DOCUMENTS 6,007,161 A    12/1999  Worsdorfer
6,231,131 B1   5/2001   Dinkel et al.
(Continued)

FOREIGN PATENT DOCUMENTS

CN    102325676 A    1/2012
CN    103253251 A    8/2013
(Continued)

OTHER PUBLICATIONS

Machine translation of DE 102012002791 (no date).*
(Continued)

*Primary Examiner* — Nicholas J Lane
(74) *Attorney, Agent, or Firm* — Panitch Schwarze Belisario & Nadel LLP

(57) ABSTRACT

An operating device for a vehicle brake system may include a control device and a piston-cylinder unit, at least one chamber of which may be connected to at least one wheel brake via at least one hydraulic line and a valve device that has at least normally open inlet valves or switching valves. The device may further include a pressure source that may be controlled to supply pressure medium to the at least one hydraulic line or to the at least one wheel brake. The control device may control pressure build-up via volume control (Continued)

Figure 1:
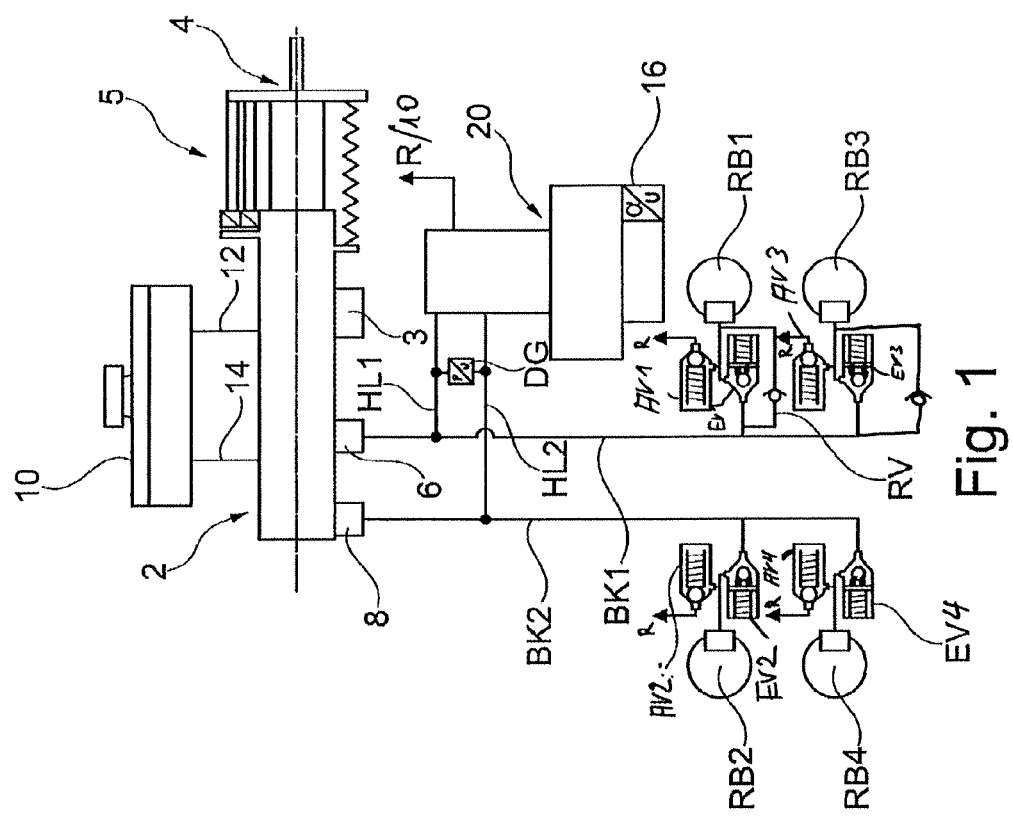

and/or time control, using inlet valves. The interior or armature chamber of an inlet valve may be connected to a corresponding brake circuit via a hydraulic line, and a valve seat outlet may be connected to a corresponding wheel brake via a hydraulic line.

20 Claims, 5 Drawing Sheets

(51) Int. Cl.
  *B60T 7/04* (2006.01)
  *B60T 8/40* (2006.01)
  *B60T 13/68* (2006.01)
  *B60T 8/32* (2006.01)
  *B60T 15/02* (2006.01)

(52) U.S. Cl.
  CPC .......... *B60T 8/4086* (2013.01); *B60T 13/686* (2013.01); *B60T 13/741* (2013.01); *B60T 15/028* (2013.01); *B60Y 2400/306* (2013.01); *B60Y 2400/81* (2013.01)

(56) References Cited

U.S. PATENT DOCUMENTS

| | | | |
|---|---|---|---|
| 9,108,604 B2 | 8/2015 | Bohm et al. | |
| 9,205,821 B2 | 12/2015 | Biller et al. | |
| 9,399,452 B2 | 7/2016 | Roll et al. | |
| 9,566,960 B2 | 2/2017 | Feigel | |
| 9,876,416 B2 | 1/2018 | Eckert et al. | |
| 10,112,592 B2 | 10/2018 | Leiber et al. | |
| 10,421,447 B2 | 9/2019 | Leiber et al. | |
| 2001/0020210 A1 | 9/2001 | Hessmert et al. | |
| 2008/0179944 A1 | 7/2008 | Spaeth | |
| 2008/0216643 A1 | 9/2008 | Cano | |
| 2009/0072615 A1* | 3/2009 | Oosawa | B60T 8/3275 303/113.1 |
| 2009/0115247 A1* | 5/2009 | Leiber | B60T 7/042 303/154 |
| 2012/0061192 A1 | 3/2012 | Birkheim | |
| 2012/0306261 A1* | 12/2012 | Leiber | B60T 8/4077 303/146 |
| 2013/0127237 A1* | 5/2013 | Pfeiffer | B60T 8/4018 303/6.01 |
| 2013/0207452 A1* | 8/2013 | Gilles | B60T 8/4081 303/9.75 |
| 2014/0333124 A1 | 11/2014 | Koo | |
| 2015/0021978 A1 | 1/2015 | Feigel | |
| 2015/0025767 A1 | 1/2015 | Feigel | |
| 2015/0028667 A1 | 1/2015 | Leiber et al. | |
| 2015/0061854 A1 | 3/2015 | Drumm et al. | |
| 2015/0069828 A1 | 3/2015 | Ueno et al. | |
| 2015/0088396 A1* | 3/2015 | Schmitt | B60T 13/745 701/70 |
| 2015/0197229 A1 | 7/2015 | Knechtges et al. | |
| 2015/0375726 A1 | 12/2015 | Roll et al. | |
| 2016/0207514 A1* | 7/2016 | Knechtges | B60T 7/042 |
| 2016/0221554 A1 | 8/2016 | Knechtges et al. | |
| 2017/0106843 A1* | 4/2017 | Jeong | B60T 11/232 |
| 2018/0126971 A1 | 5/2018 | Leiber et al. | |
| 2019/0031165 A1 | 1/2019 | Besier et al. | |

FOREIGN PATENT DOCUMENTS

| | | | | |
|---|---|---|---|---|
| CN | 104136291 A | 11/2014 | | |
| CN | 104149763 A | 11/2014 | | |
| CN | 104169141 A | 11/2014 | | |
| DE | 19600603 A1 | 7/1997 | | |
| DE | 19601268 A1 | 7/1997 | | |
| DE | 19601417 A1 | 7/1997 | | |
| DE | 102005055751 A1 * | 11/2006 | ............. | B60T 7/042 |
| DE | 102008046993 A1 | 4/2009 | | |
| DE | 102009043484 A1 | 3/2011 | | |
| DE | 102011077329 A1 | 1/2012 | | |
| DE | 102011118365 A1 | 5/2013 | | |
| DE | 102012002791 A1 | 8/2013 | | |
| DE | 102012002791 A1 * | 8/2013 | ............. | B60T 7/042 |
| DE | 102013203594 A1 | 9/2013 | | |
| DE | 102013222061 A1 | 9/2014 | | |
| DE | 102013224313 A1 | 9/2014 | | |
| DE | 102013014173 A1 | 2/2015 | | |
| DE | 102013014188 A1 | 2/2015 | | |
| DE | 102013218121 A1 | 3/2015 | | |
| GB | 2201208 A | 8/1988 | | |
| JP | 2000025602 A | 1/2000 | | |
| JP | 2007022404 A | 2/2007 | | |
| JP | 2009067262 A | 4/2009 | | |
| JP | 2011042330 A | 3/2011 | | |
| JP | 2013520344 A | 6/2013 | | |
| WO | 2003038246 A2 | 5/2003 | | |
| WO | 2014135402 A1 | 9/2014 | | |

OTHER PUBLICATIONS

Int'l Search Report dated Aug. 1, 2016 in Int'l Application No. PCT/EP2015/081403.
Written Opinion dated Aug. 1, 2016 in Int'l Application No. PCT/EP2015/081403.
Int'l Search Report dated Feb. 27, 2017 in Int'l Application No. PCT/EP2015/081401.
Int'l Search Report dated Feb. 14, 2017 in Int'l Application No. PCT/EP2015/081402.
Written Opinion dated Feb. 27, 2017 in Int'l Application No. PCT/EP2015/081401.
Written Opinion dated Feb. 14, 2017 in Int'l Application No. PCT/EP2015/081402.
Int'l Preliminary Report of Patentability dated Sep. 19, 2017 in Int'l Application No. PCT/EP2015/081402.
Int'l Preliminary Report on Patentability dated Sep. 19, 2017 in Int'l Application No. PCT/EP2016/055703.
Int'l Search Report dated Jul. 28, 2016 in Int'l Application No. PCT/EP2016/055703.
Int'l Preliminary Report on Patentability dated Sep. 19, 2017 in Int'l Application No. PCT/EP2015/081403.
Int'l Prelimininary Report on Patentability dated Sep. 19, 2017 in Int'l Applicatin No. PCT/EP2015/081401.
Leiber et al., "Modular Brake System with Integrated Fuctionalities", ATZ Magazine, vol. 113, pp. 20-25, Jun. 2011.
Office Action dated Mar. 3, 2020 in U.S. Appl. No. 15/558,385 by Leiber.
Office Action dated Oct. 22, 2020 in U.S. Appl. No. 15/558,385 by Leiber.
Office Action dated Oct. 5, 2020 in U.S. Appl. No. 15/558,438, by Leiber.
Office Action dated Jun. 25, 2020 in Indian Application No. 201717035196.
Office Action dated Dec. 19, 2019 in Japanese Application No. 2017-548871 (no translation, shown for relavance).
Office Action dated Oct. 19, 2020 in Japanese Application No. 2017-548871 (no translation, shown for relevance).
Office Action dated Jun. 3, 2019 in Chinese Application No. 201580077959.8 (no translation, shown for relevance).
Office Action dated Oct. 28, 2020 in Chinese Application No. 201580077959.8.
Office Action dated Oct. 17, 2022 in Japanese Application No. 2021-144039 (w/English Translation).

* cited by examiner

PRESSURE BUILD-UP CONTROLLED BRAKE SYSTEM WITH SPECIFIC INTERCONNECTION OF INLET VALVES WITH BRAKE CIRCUIT/WHEEL BRAKES AND METHOD FOR CONTROLLING PRESSURE

CROSS-REFERENCE TO RELATED APPLICATION

This application is a Section 371 of International Application No. PCT/EP2015/081403, filed Dec. 30, 2015, which was published in the German language on Sep. 22, 2016 under International Publication No. WO 2016/146224 A1, which claims priority under 35 U.S.C. § 119(b) to German Patent Application No. 20 2015 107 079.9, filed Mar. 16, 2015, German Patent Application No. 20 2015 107 075.6, filed Mar. 16, 2015, and German Patent Application No. 20 2015 107 072.1, filed Mar. 16, 2015, the disclosures of which are incorporated herein by reference in their entireties.

The invention relates to an operating device, in particular for a vehicle brake system according to the preamble of claim 1.

Since ABS went into series production in 1978, during ABS control, following pressure reduction ($P_{ab}$), the pressure has been built up ($P_{auf}$) in stages via inlet valves (EV). More recently the inlet valve (EV) has been controlled by PWM (Pulse Width Modulation) for more accurate pressure control. The pressure build-up ($P_{auf}$) is time-controlled via the inlet valve (EV), and the pressure amplitude is a function of the timing control of the valve opening and other parameters such as differential pressure across the valve, valve pressure and temperature. The staged pressure build-up ($P_{auf}$) also generates noise due to pressure oscillations.

In order to improve both the accuracy of the pressure amplitude and the noise, in patent applications DE 10 2005 055751 and DE 10 2009 008944 the applicant proposed what is known as a multiplex method (MUX). This is understood to mean a regulation and control method in which actuators connected to a pressure source (such as a piston, double-stroke piston, differential piston, pump), in particular wheel brakes, have pressure applied, wherein by means of measurement and control of the volume of the pressure source a pressure build-up and pressure reduction in the actuators is controlled. In particular, the pressure amplitude for the pressure build-up ($p_{auf}$) and pressure reduction ($p_{ab}$) is achieved by volume dosing of a piston system, wherein the pressure amplitude is derived from the p-V curve (pressure-volume curve) of the wheel cylinder. This method is accurate and low-noise.

DE 10 2013 203 594 A1 discloses a method with volume control via a piston with conventional inlet valves and in addition non-return valves connected in parallel. In the case of pressure differentials in the controlled ABS pressure in the wheel cylinders during control, the control pressure must always be greater than the maximum pressure in the wheel brakes. The pressure differential can be very high, in particular during p-split braking. The method known from DE 10 2013 203 594 A1 requires knowledge of the current pressure ratios in the wheel cylinders, so that volume does not flow inadvertently from a wheel cylinder via the non-return valve connected in parallel with the inlet valve associated with the wheel cylinder. If the pressure ratios are only estimated, errors in the pressure of ±15 bar can occur. Since for control, pressure values must be compared, during the comparison pressure errors can also occur that are twice as big: ±30 bar. Since in the method it must be ensured that the pre-pressure is not below the pressure in the wheel cylinders, the control pressure must therefore be maintained at, at least, 60 bar above the estimated pressure of the wheel cylinders. With PWM control of the valves, the closing pressure of the valves is subject to dispersions that are, for example, dependent upon the coil temperature of the valves. Because of this, the control pressure must be further increased. In order for the method known from DE 10 2013 203 594 A1 to work reliably, the control pressure must be in a range of 100 bar above the maximum pressure in the wheel brakes. During pressure build-up, the valve develops a flow resistance, as a result of which the control pressure increases further. These necessarily high control pressures place considerable strain on the brake system and the valves, and disadvantageously it is not possible to use valves with a large cross-section.

The inlet valves (EV) constitute a choking resistance in the braking system, constituting a considerable stagnation pressure at high pressure build-up speeds, which at the fall-back level in the event of failure of the brake booster (BKV) makes itself felt in the form of an increased stopping path. With an integrated ABS the stagnation pressure places a load on the engine of approximately 10% for pressure generation.

OBJECT OF THE INVENTION

The object of the invention is to further improve the generic operating device, whereby in particular the pressure build-up $P_{auf}$ can be more accurately controlled without PWM methods necessarily having to be used and without the valves having to be designed with a large cross-section, that is low flow resistance, rather than reliable switching capability at high differential pressures. Since the differential pressure resistance of valves, among other things, determines the cost of the valves, the intention is that the method will allow a reduction in costs. Furthermore, the intention is to reduce the noise during pressure build-up $P_{auf}$.

The object is achieved according to the invention by the features of claim 1.

In the new method, at $p_{auf}$ the control pre-pressure $p_{vor}$ is set individually for the respective wheel brake with a relatively small pressure differential of, for example, approximately 10-20 bar at actual pressure level, which is primarily dependent upon the coefficient of friction of the road. Here, the small pressure differential of, for example, approximately 10-20 bar is adhered to for all actual pressure levels. Where for at least two wheel brakes the wheel pressure has to be increased and for this various target pressures are determined, in the following the maximum control pre-pressure $p_{vor}$ be set via the pressure source is referred to as the maximum pressure $p_{vor,max}$. This maximum pressure $p_{vor,max}$ can be lower than the actual pressure contained in a wheel brake, provided that in this wheel brake the brake pressure does not have to be changed. Due to the possibility of being able to set the wheel brake pressure by means of volume control $\Delta V$ and/or by means of timing control $\Delta t$ in various wheel brakes, considerable advantages arise with regard to the dynamics of the brake system. Thus, by means of the prescribed control pre-pressure $p_{vor}$, which, for example, is 10-20 bar higher than the actual pressure to be set in, for example, two wheel brakes, the target pressure in these wheel brakes can be adjusted or set simultaneously, with a time overlap or one after the other. Thus, for example, through the predefined timed opening of the switching valve associated with the respective wheel brake, the target pressure can be increased to the required target pressure. Here, timed opening is understood to be a one-off opening for a predetermined length of time Δt. At the end of the length of time Δt, the valve concerned is closed. The timed opening according to the invention therefore differs significantly from the PWM method. Slight oscillations in the flow quantities also take place. In addition, substantially smaller pressure differentials arise at the valve than with ABS pressure controllers according to the state of the art, with which the control pre-pressure $P_{vor}$ acting simultaneously for all wheel brakes can reach very high values, for example of up to 200 bar, and which are a result of the pedal operation. For the same flow cross-section of the valve cross-section, therefore, the necessary opening forces at the valve during ABS operation are smaller with the method according to the invention than with the ABS control method known from the state of the art. With the method according to the invention, therefore, the electrical current for closing the valve can be limited to lower values than with the previously known ABS control method. Obviously, it is also possible that for the same electrical valve current, the valve cross-section with the method according to the invention can be designed with a larger flow cross-section than with the previously known ABS control method. Due to the timing control of the valves during closing with smaller pressure differentials, less hydraulic oscillations occur and thus less noise than with large pressure differentials. The pressure changes at the pressure source with the new method, e.g. piston, are, due to the lower pressure differentials, similarly smaller than with a standard ABS. With a reduced volume flow over time through the valve towards the end of the pressure build-up $P_{auf}$ the pressure oscillations when the valve closes are minimal, so that only the closing sound of the valve continues to constitute a source of noise. This noise can be significantly further reduced by a slow reduction in the magnetic force, through corresponding voltage or current control of the valve.

With the solution according to the invention or its advantageous embodiments it has been discovered surprisingly easily that the pressure build-up in a braking device can be controlled very accurately, wherein in particular also the stagnation pressure at the inlet valve of the braking device can be kept low.

Advantageous embodiments of the invention are indicated by the further claims, to which reference is made here, wherein these can advantageously be supplemented by further features or combinations of features from the specific exemplary embodiments presented in the description of the figures.

Advantageous specific exemplary embodiments of the invention are presented in the drawing and described in more detail hereinafter.

Figure 1A:
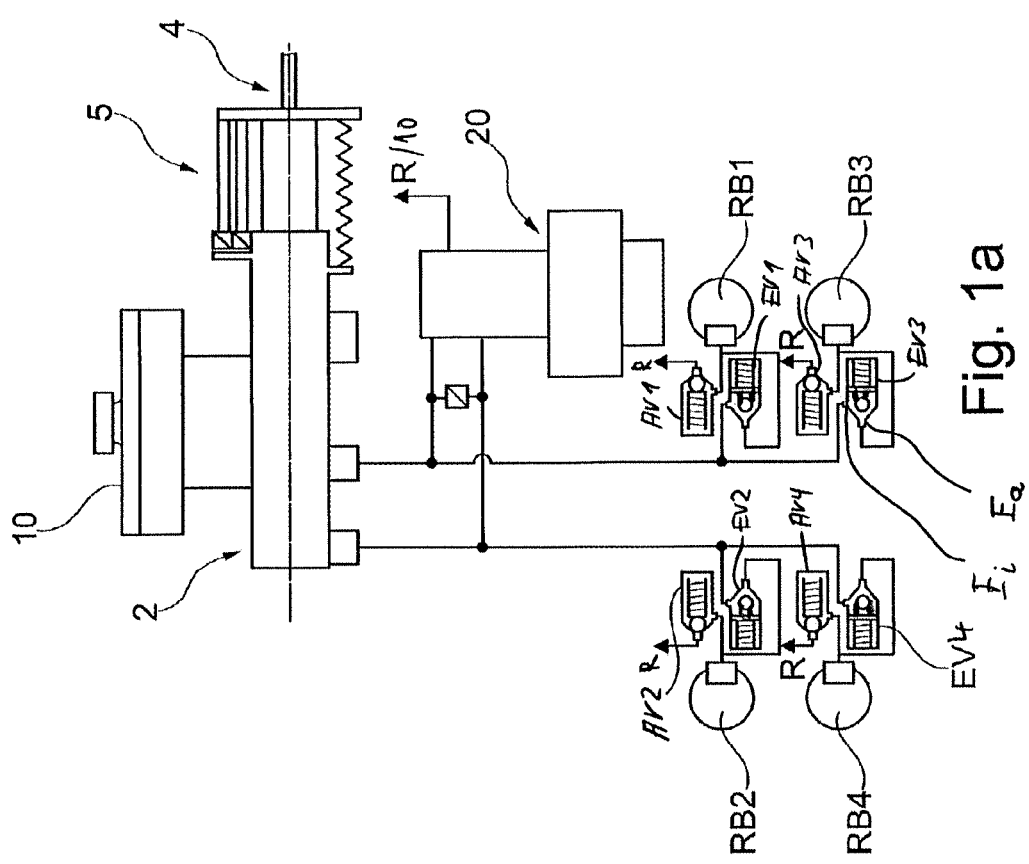
Figure 1B:
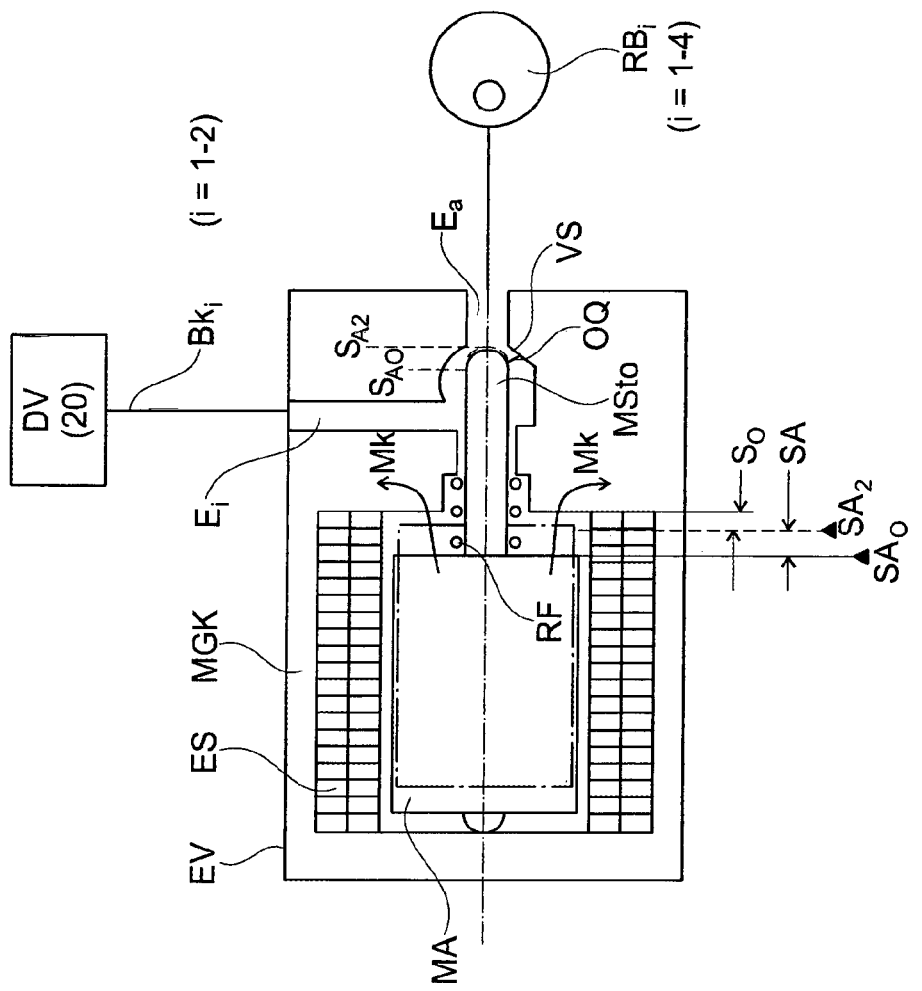
Figure 1B:
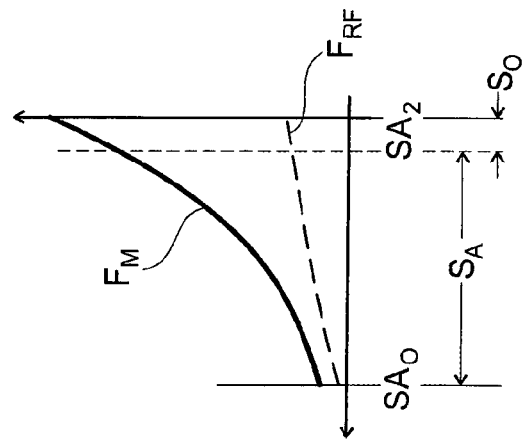
Figure 2:
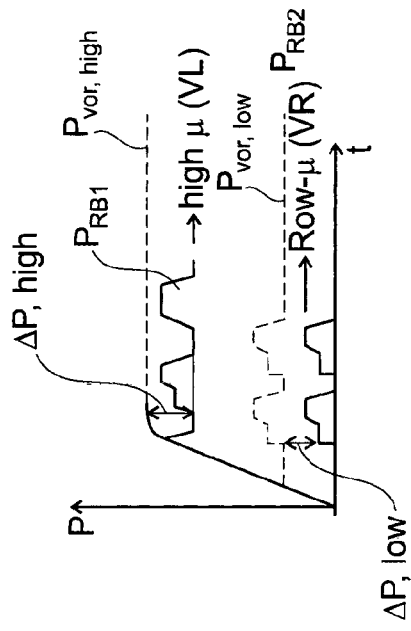
Figure 2A:
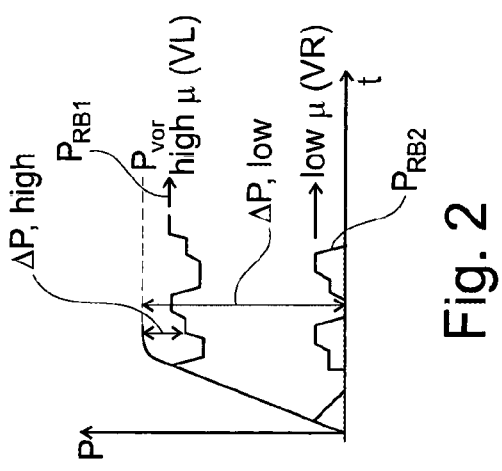

The drawings show as follows:

FIG. 1: a braking device as described in DE 10 2014 107112 from the applicant or DE 10 2012 002 791 A1;

FIG. 1a: a valve circuit according to the invention with inlet valve (EV) and outlet valve (ΔV);

FIG. 1b: inlet valve according to the invention in brake circuit;

FIG. 2: possible basic progressions of the wheel brake cylinder pressure (P) as a function of time (t) during ABS operation;

FIG. 2a: maximum pressure differentials that can occur at $P_{auf}$ in ABS operation on a non-slip and slippery road at the wheels.

Figure 4:
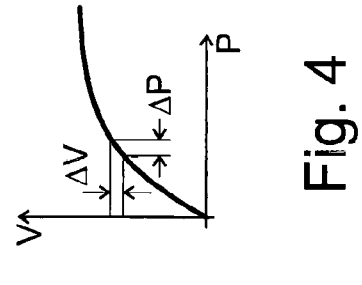
Figure 5:
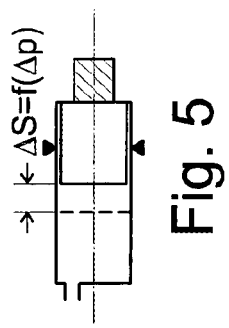
Figure 3:
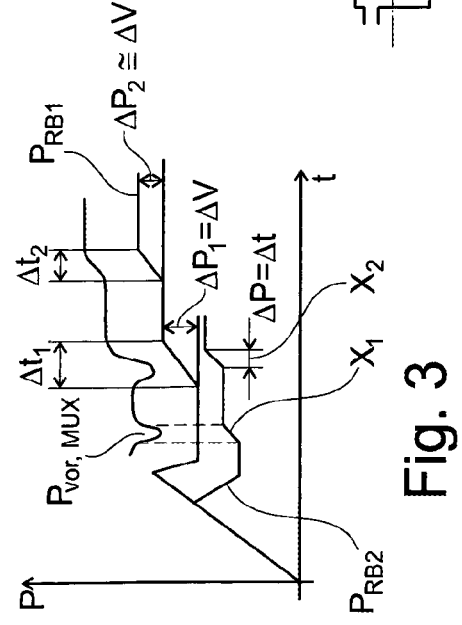
Figure 6A:
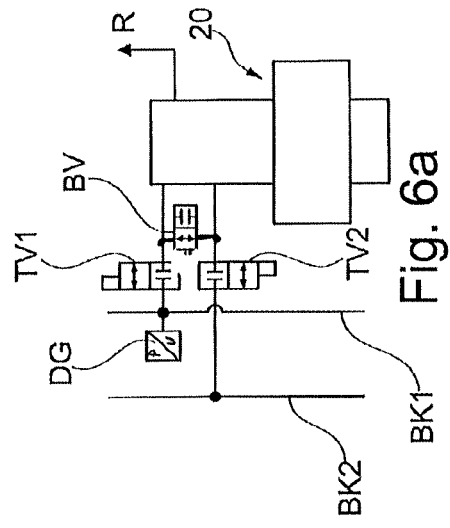
Figure 6B:
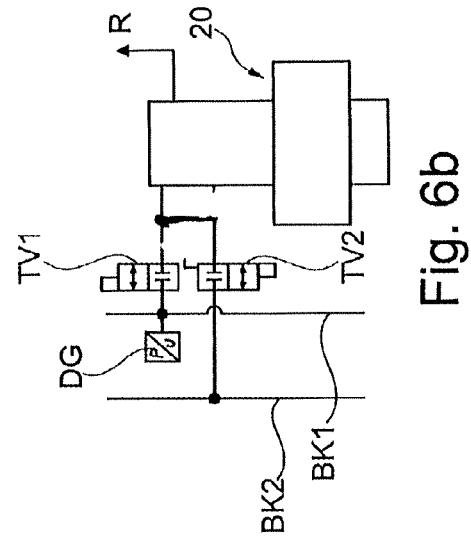
Figure 6:
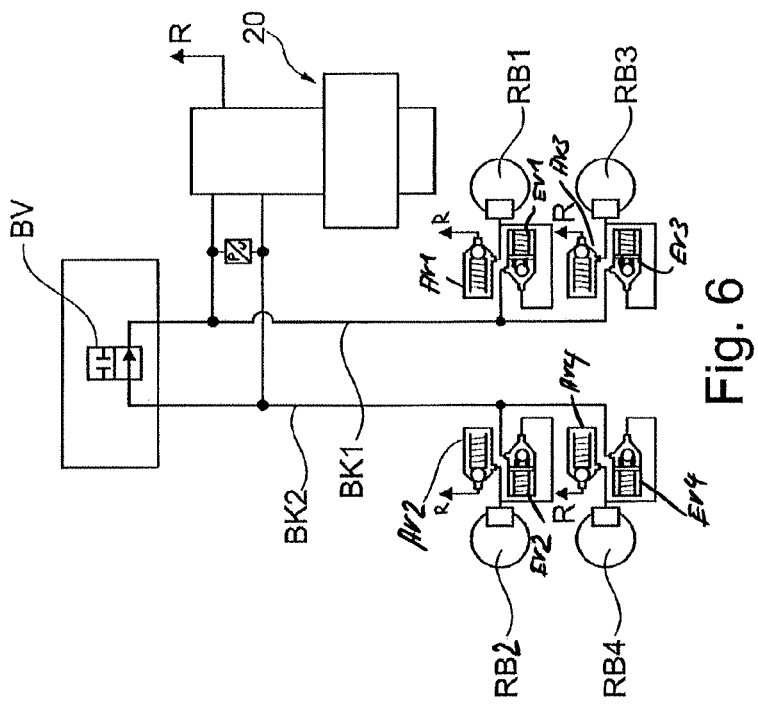

FIG. 3: various possibilities for controlling increases in pressure (P) in the wheel brake cylinders during ABS operation;

FIG. 4: correlation between pressure change and volume change in the wheel brake cylinder;

FIG. 5: correlation between volume displacement and piston displacement;

FIG. 6: connection of the brake circuits (BK1 and BK2) arranged separately on the piston cylinder unit or via bypass-valve (BV) for special functions, e.g. ABS;

FIG. 6a: a dual circuit pressure supply, in which the brake circuits (BK1 or BK2) are optionally separate or joined together with isolation valve TV1 or isolation valve TV2; and FIG. 6b: a single circuit pressure supply, connected with the brake circuits (BK1 and BK2) via isolation valves (TV1 and TV2).

The operating device shown in FIG. 1 for a brake system has a first piston cylinder unit (main cylinder) 2, which can be operated for pressure generation by means of an operating device 4, wherein a brake pedal (not illustrated in more detail) can be a component of the operating device or connected to this. In order to generate the pedal feel, a path simulator is expediently used that creates the usual relationship between pedal force and pedal path. The operating device is expediently provided with a sensor device 5 for controlling the brake booster (BKV control), as described in more detail, for example, in DE 10 2010 050132 A1 from the applicant, to which reference is made here. Here, the first piston cylinder unit 2 has two cylinder or working chambers, connected via switching valves 6, 8 for controlling the brake booster function and hydraulic lines BK1, BK2 with wheel brakes, RB1, RB2, RB3 and RB4. In the hydraulic lines BK1, BK2 the inlet valves EV1, EV2, EV3 and EV4 associated respectively with the wheel brakes are arranged. From the branched lines leading to the wheel brakes, further return lines in each case branch off, leading via outlet valves AV1, AV2, AV3 and AV4 to a reservoir 10, connected via hydraulic lines 12, 14 with the working chambers of the first piston cylinder unit 2.

A pressure supply device (hereinafter referred to also as "DV"), here in the form of a further piston cylinder unit 20, is connected via hydraulic lines HL1, HL2 with the hydraulic lines BK1 or BK2.

Between the hydraulic lines HL1 and HL2 a pressure sensor DG is arranged. The signals from the pressure sensor DG and other devices are processed in a primarily known manner in an electronic control and regulation unit ECU (not shown).

Here, the piston cylinder unit 20 has a drive (not shown in more detail), in particular a high performance electric motor and possibly transmission for converting a rotational movement into a linear movement (in particular a ball screw transmission). The piston of the second piston cylinder unit is expediently implemented as a double-stroke piston, as described in more detail for example in DE 10 2013 110188 A1 from the applicant, to which reference is made here. The drive is provided with a rotation sensor/path sensor 16 for volume dosing of the pressure supply. A hydraulic return line R connects the piston cylinder unit with the reservoir 10. In the connection with the reservoir further hydraulic elements (non-return valve(s), solenoid valve(s)) can optionally be arranged For future brake systems it is important that, when dimensioning the valve, account is taken of the fact that the flow losses are low. Here a flow volume should be considered that is consistent with the time-to-lock (TTL) time. TTL is dimensioned such that the locking pressure for high μ must be reached within 150 ms.

The operating device is shown in FIG. 1 with a conventional valve circuit for ABS with four inlet valves EV and four outlet valves ΔV. For this there are two variants with variant A have having a non-return valve RV parallel to each inlet valve (in FIG. 1 by way of example shown only in one brake circuit for wheel brake RB1 and RB3) or variant B with stronger return spring in the inlet valve EV for high differential pressure. Variant A is used in brake systems of the state of the art (e.g. DE 10 2013 224 313) and allows no pressure retention through closing of inlet valves, since a pressure reduction takes place via the non-return valves at lower pre-pressure than the actual pressure in the wheel brakes. Therefore, in particular in control mode or in another control situation in which different pressures are controlled in the wheel brakes (e.g. recovery, blending) the pre-pressure must always be dimensioned higher than the actual pressure of all wheels. This results in highly accurate timing control or requires PWM operation or valves with low production tolerances. In addition, the flow cross-section of the valves must be limited.

In ABS operation, the locking pressures vary greatly between the front axle (VA) and rear axle (HA). During p-split an extreme differential pressure of up to 130 bar is reached.

If now the control pressure is in the region of the locking pressure, then in the brake circuit corresponding pressure differentials of approximately 130 bar can arise, i.e. the high-μ inlet valve (high-μ EV) must withstand a maximum pressure of 130 bar, if atmospheric pressure (approx. 1 bar) exists at the low-μ inlet valve (low-μ EV). In other words, the operating device or braking device must be in a position to reliably handle states resulting from these and possibly other conditions (differential pressure reliability).

Case b, in which the inlet valve has a strong return spring, is critical, if at the high-μ inlet valve (high-μ EV) the electrical actuation fails and the control pressure, for example in the event of a fault, drops to atmospheric pressure bar. Here, the high-μ inlet valve (high-μ EV) must open at the high wheel cylinder pressure that, for example, is only possible through the strong force of the aforementioned return spring (RF) in the inlet valve (EV). A strong return spring, however, at the same time involves high magnetic forces, meaning that the valve becomes expensive and the valve, due to the high speed of armature impact against the stop is noisy or loud.

The pressure sensor DG is necessary for evaluating and saving the p-V curve and for determining the pressure level of both brake circuits. The pressure values are stored or read in control electronics (ECU) not shown here. The pressure sensor DG is symbolically connected with both brake circuits, which can be achieved with a pressure sensor DG primarily in brake circuit 1 (BK 1) if, for example, the brake circuits are connected in parallel by appropriate valve circuitry for the pressure build-up $P_{auf}$.

FIG. 1a shows an amended valve circuit according to the invention with inlet valve EV and discharge valve ΔV and no non-return valves RV. Here, the inlet valve (EV) is connected via the inner chamber of the valve with the brake circuit BK1 or BK2, such that the pre-pressure $P_{vor}$ supports the closing force of the inlet valve EV, wherein the direction of flow of the inlet valves EV compared to the direction of flow of the inlet valves EV according to FIG. 1 is reversed. Here, the valve flow takes place according to FIG. 1a via the armature chamber of the inlet valves EV. This is achieved in that the valve inlet shown in FIG. 1 is used according to FIG. 1a as a valve outlet, wherein the valve outlet is connected via a hydraulic connection with each of wheel brakes RB1, . . . , RB4, in other words the connections of the inlet valve EV to the wheel brake cylinder and to the brake circuit have been reversed. If now the aforementioned case of an "actuation failure" occurs, then the wheel brake cylinder pressure opens the inlet valve(s) EV.

When dimensioning the valve, in the case of a closing device of the abovementioned type, the return spring must be designed such that the pressure differentials between the inlet valve inlet in the armature chamber and the inlet valve outlet behind the valve seat do not lead to the valves not closing when there is a dynamic pressure build-up. The highest pressure build-up dynamics are reached in an emergency braking situation (TTL relevant), or in the event of extreme pressure changes (e.g. μ-jump) in control mode. The return spring must therefore be designed for the maximum pressure build-up dynamics in the valves. If the cross-sectional area in the valve seat of the valves is increased, this is advantageous for a reduction in the pressure differentials in the valve and at the same time leads to an easing of the burden on the motor for achieving a short TTL. The higher cross-sectional areas, in turn, lower the return spring dimensioning requirements and thus the valve magnetic force.

The maximum magnetic forces are low, since the maximum pressure differential of 130 bar acts between the wheel brake cylinder pressure (130 bar) and the main brake cylinder pressure (atmospheric pressure 1 bar) and with the valve closed, i.e. a low armature air gap. Conventional inlet valves EV have to function in the face of very high differential pressures of up to approximately 250 bar between a high main brake cylinder pressure of 250 bar and a wheel brake cylinder pressure of 1 bar and at stagnation pressure at high flow volume and pressure build-up speed.

Through the reversed arrangement of the inlet valve, the possibility now arises of dimensioning the inlet valve EV with a larger cross-section and thus with a low stagnation pressure.

FIG. 1b shows a possible configuration of the inlet valve EV according to the invention and the connection to the brake circuit BK and the pressure supply DV and the wheel brakes RBi.

The inlet valve EV has a magnetic armature MA, a magnetic main body MGK and an exciter coil ES. If current is passed through the solenoid valve EV, the magnetic force MK displaces the armature MA from the position $S_{A0}$ into position $S_{A2}$ by the differential movement $S_A$. The magnetic armature MA moves a plunger MStö by the same distance, so that the plunger MStö comes up against the valve seat VS and closes the outlet Ea of the solenoid valve. At this point there is still a residual air gap $S_0$ between the armature MA and the main body MKG, which is provided so that the armature MA, when the current flow through the exciter coil ES of the valve EV is switched off, does not stick to the magnet housing MGK through hysteresis losses. Once the valve current is switched off, the return spring RF moves the armature MA back into the starting position. Here, as the air gap narrows and the travel lengthens the magnetic force $F_M$ increases in a non-linear manner. The return spring $F_{RF}$ is dimensioned in such a way that the magnetic force $F_M$ in the starting position $S_{A0}$ is greater than the spring force, such that reliable closing of the valve is guaranteed. The spring force increases as the path $S_A$ lengthens and in the end position $S_{A2}$ is similarly lower than the magnetic force $F_M$. A linear spring is preferably used, so that the magnetic force $F_M$ in the end position for a given current is significantly higher than the restoring force, so that the valve can be held with a low current or a reliable closing is guaranteed even at high differential pressures between the wheel brake and pressure supply. Holding is also ensured at high differential pressures, since the magnetic force in the closed valve position increases in an intensely non-linear manner. The return spring, however, must also be dimensioned so that functioning can be ensured as a normally open valve and the valve always opens reliably.

The outlet $E_a$ of the valve is connected to the wheel brakes RBi (RB1-RB4), the inlet $E_i$ to a brake circuit BKi or to the pressure supply device DV (20). Through such a connection, the inlet valve EV can be opened both by the return spring RF and by the pressure in the wheel brake, which in particular in the event of a fault or malfunction of the brake system (e.g. voltage failure to the valve) is very important. In addition, at high pressures in the brake circuit and low pressures in the wheel brake, also, only the pressure differential between inlet Ei and outlet Ea acts on the plunger MStö. This differential pressure at the valve is relatively low in the pressure build-up, but must be taken into account when designing the spring RF, so that the pressure differential does not lead to the valve being pushed closed during pressure build-up, if the volume is being delivered from the pressure supply DV to the wheel brake. Valves with a large opening cross-section ÖQ or low flow losses reduce this effect In particular when there is a pressure build-up with pressure volume control or timing control with low differential pressure between pre-pressure and actual pressure, the valves described above with large opening cross-section can be used in the wheel brake, since the control accuracy is very high. In turn, this has the advantages that only low flow losses, in particular with rapid pressure build-up (TTL), occur and the drive motor only requires low power for rapid pressure build-up in the shortest time (TTL=150 ms).

In addition, due to the low flow losses of the advantageously designed inlet valves a pressure reduction via the inlet valves can take place quickly. A more accurate pressure reduction via the inlet valves EV can be performed by corresponding control of the piston movement of the pressure supply unit 20. Optionally, it is also possible to convert the known MUX method with the valve circuit described above or with the pressure reduction control via outlet valves AV in a brake circuit, in particular for consumers with a low volume balance, such as for example the wheel brakes of the rear axle. That is to say that a combination is also possible that uses the MUX method in association with the new valve circuitry in just two wheel brakes (e.g. front axle) with pressure reduction taking place conventionally on two further wheel brakes. This would mean that two wheel brakes/actuators are provided with inlet and outlet valves (EV+AV) and two wheel brakes/actuators with just inlet or switching valves EV. In this case, just the wheel brakes of the front axle could be fitted with the new valve circuit of the invention according to FIGS. 1a and 1b, with standard circuitry/standard valves being used on the rear axle.

FIG. 2 shows possible basic progressions of the wheel brake cylinder pressures (P) as a function of time (t) during ABS operation with standard ABS. The driver activates the brake with pre-pressure $p_{vor}$ by operating the brake pedal (not shown in FIG. 1). A condition of this is that the driver operates the brake pedal in such a way that all wheels pass into ABS control.

On a slippery road, the wheel brake cylinder pressures p, set through the action of the ABS control, are low. This progression is referred to as "low-µ". The pressure differential $\Delta p_{low}$, between the pre-pressure D vor and the wheel brake cylinder pressure $p_{low\text{-}\mu}$ can assume high values, since the uncontrolled pre-pressure $p_{vor}$ can reach values of up to 250 bar. At the controlled pre-pressure, this $\Delta p_{low}$ can be approximately 50 bar, if the wheel brake cylinder pressure is at a maximum value of 30 bar.

On an asymmetrical road (µ-split), on which the left and right wheels roll on a road surface with different grip, with the action of the ABS control on the left and right wheels different brake cylinder pressures are set on the left and right wheels. For example, on the left front wheel RB1 a higher brake pressure $p_{RB1}$ is then present, while on the right front wheel RB2 a lower brake pressure P RB2 exists. With the controlled pre-pressure this $\Delta p_{low}$ can be approximately 150 bar, if the wheel pressure differential between low and high is at a maximum value of 130 bar.

In multiplex operation, the time-varying pressure control p(t) in the wheel brake cylinder is brought about by volume displacement of the pressure supply unit DV into the wheel brake cylinder. If the inlet valve EV closes, then the pressure in wheel brake cylinder P should no longer change. If the pressure supply unit DV has increased the pressure at the left front wheel (VL) $P_{RB1}$ and it is intended for the pressure supply unit DV to then increase the pressure at the right front wheel $P_{RB2}$, then the pressure at the left front wheel $P_{RB1}$ should not change during this process of pressure increase at the right front wheel $P_{RB2}$.

This multiplex operation condition imposes design conditions on the inlet valve EV. Conventional inlet valves EV have a non-return valve, shown and designated in FIG. 1 by way of example by "RV", integrated into the valve. This non-return valve is intended in the event of a "valve control failure" fault to bring about pressure relief of the wheel brake cylinders. The non-return valve does not allow any "pressure maintenance" of the pressure at the left front wheel (VL), if the pressure supply unit DV sets the pressure at the right front wheel $P_{LOW\text{-}\mu}$ (VR) at a low pressure level. Through the non-return valve RV of the inlet valve EV of the left front wheel brake fluid then flows back into the pressure supply unit DV, as a result of which the pressure in the wheel brake cylinder at the left front wheel $P_{high\text{-}\mu}$ is reduced to a level just above the wheel brake cylinder pressure at the right front wheel $P_{low\text{-}\mu}$, shown by the dot-dashed line. The large pressure differential $\Delta P$ between the wheel brake cylinders at the left front wheel $P_{high\text{-}\mu}$ and at the right front wheel $P_{low\text{-}\mu}$ cannot be maintained.

One remedy is to omit the non-return valve RV from the inlet valve EV. In multiplex operation the pressure differential $\Delta P$ between the wheel brake cylinders at the left front wheel $P_{RB1}$ and at the right front wheel $P_{RB2}$ can then be maintained. In order that in the event of a "valve control failure" fault the pressure does not continue to be contained in the wheel brake cylinder, the return spring force of the inlet valve EV must be specified to be higher. The return spring force must be increased to such a strength that the inlet valve EV opens reliably even at high pressure in the wheel brake cylinder P. As a function of the increase in the return spring force, the trigger current $I_{EV}$ for the inlet valve must be raised in order to keep the valve closed even at high differential pressure between the pre-pressure $P_{vor}$ and the wheel brake cylinder pressure P. As already mentioned, however, this makes the inlet valve EV expensive due to correspondingly high magnetic forces and causes loud noises due to the high speed of armature impact against the stop.

By using a special inlet valve EV, or "pressure-relieved valve", having to specify a higher return spring force of the inlet valve EV can be avoided. These valves are similarly expensive and therefore according to the invention a changed valve circuit of the inlet valve EV and with no non-return valve RV is proposed, as shown and described in FIG. 1a. Here the inner chamber of the inlet valve EV is connected with the brake circuit BK1 or with the brake circuit BK2. If now the abovementioned "valve control failure" fault occurs, then the wheel brake cylinder pressure opens the inlet valve EV automatically.

If the inlet valve EV is closed, then the trigger current $i_{EV}$ for the inlet valve EV only has to be high enough for the pressure differential ΔP between the higher wheel brake cylinder pressure P and the lower pre-pressure $P_{vor}$ to be maintained. The magnetic forces are correspondingly small, since the maximum pressure differential of 130 bar acts between wheel brake cylinder pressure (130 bar) and pre-pressure (0 bar) and with a closed valve, i.e. a small armature air gap. During multiplex operation the trigger current $i_{EV}$ for the inlet valve EV must be a maximum for the maximum pressure differential ΔP.

FIG. 2a shows the maximum pressure differentials that can occur at $P_{auf}$ in ABS operation on a non-slip and slippery road at the wheels. Here, $Δp_{high}$ is the maximum pressure differential, that can occur on a non-slip road, while $ΔP_{low}$ is the maximum pressure differential on a slippery road. Due to the multiplex operation here the maximum pressure differential both between P vor-high and $P_{RB1}$, $ΔP_{high}$, and between $P_{vor-low}$ and $P_{RB2}$, $ΔP_{low}$, is low. Therefore, the valve currents do not need to be too great to close the valves either.

The different pre-pressures $P_{vor-low}$ and $P_{vor-high}$ are dynamically adjusted by corresponding control of the pressure supply unit, i.e. in the event of switching between RB1 and RB2, first the piston of the pressure generation unity is retracted, in order prior to opening of the inlet valve of RB2 to set a lower pre-pressure level. When switching from RB2 to RB1 the piston is extended.

Before a wheel brake pressure change starts, the target pressure starts at the actual pressure up to a maximum of 40 bar higher than the actual pressure of the respective wheel brake. The pre-pressure level is dynamically changed such that the pressure differential between the pre-pressure and the wheel target pressure level (in this representation $p_{RB2}$ or $p_{RB1}$ are target pressures, not wheel actual pressures) remains approximately constant. This allows a relatively accurate timing control of the valves and thus reduces the valve production tolerance requirements.

Due to the switching of the piston, a pressure build-up in RB1 and RB2 can only take place with a time lag, which due to the short delay times has a minor impact on the controller performance. The effect of the controller performance can be minimised by using a high-performance motor. The pressure reduction in the wheel brakes RB1-RB4 can take place in a timed manner at any point without delay.

FIG. 3 shows different possibilities of how the increases in pressure P can be controlled in the wheel brake cylinders during ABS operation. Again, an exemplary progression of the pressure in wheel brake cylinder RB1 ($P_{RZ1}$) and in wheel brake cylinder RB 2 ($P_{RB2}$) is shown as a function of time (t). $P_{vor-MUX}$ indicates the pre-pressure $P_{vor}$ necessary due to the multiplex operation.

The pressure progression at x1 in wheel brake cylinder 2 $P_{RB2}$ shows a controlled increase in pressure from the opening of the inlet valve EV of the wheel brake cylinder RB 2 for a certain length of time Δt, without volume control ΔV taking place. The inlet valve of wheel brake RB1 is closed during this time and the pressure in wheel brake RB1 is maintained and can also be optionally changed via outlet valves (not shown in the pressure progression over time in FIG. 3). This controlled increase in pressure $P_{auf}$ is designated as timing control (Δt control), wherein for the length of time Δt the inlet valve EV is opened, and the length of time Δt is determined as a function of the size of the jump in pressure build-up $P_{auf}$ and inter alia the pressure differential between the pre-pressure $P_{vor,MUX}$ and the pressure in the wheel brake cylinder $P_{RB2}$. With Δt control the piston is not, as described above, first retracted in order that prior to opening of the inlet valve of RB2 a lower pre-pressure is set. Instead, the inlet valve is immediately opened and the piston immediately displaced such that a higher pressure level results in the brake circuit $P_{vor,MUX}$ (higher $P_{RB2}$). As a result, the pressure build-up in P RB2 begins earlier. This is intended in rare cases to be an alternative to the volume control, if for example the multiplex control is shortly before a pressure reduction. The Δt control requires less time to be spent on adjusting the piston of the pressure supply (DV). Opening the inlet valve EV does not result in any appreciable increase in pressure in wheel brake cylinder RB2, because the pressure supply DV has a high hydraulic rigidity. If now the inlet valve EV is opened, then the pre-pressure $P_{vor,MUX}$ drops. In order that the pre-pressure P vor-MUX remains approximately constant, the pressure supply DV must deliver volume. In doing so, the pre-pressure $P_{vor,MUX}$ is r ideally regulated at a small amount (e.g. 20 bar) above the pressure in wheel brake cylinder RB2 ($P_{RB2}$). Thus, the loading of the pressure supply DV is kept to a minimum.

At time X2 in parallel with the control of the volume change ΔV in wheel brake cylinder RB 1 for a pressure increase $Δp_1$ in the valve opening time $Δt_1$, a timing control Δt control for wheel brake cylinder RB 2 is set. During the opening time of the inlet valve of wheel brake cylinder RB 1 ($Δt_1$) the inlet valve of wheel brake cylinder 2 is opened briefly for Δt, as a result of which the pressure in the wheel brake cylinder 2 is raised by the amount Δp. The corresponding volume must be taken into account in the piston control of the pressure supply DV. In the event, the volume corresponds to the volume change for the pressure-volume curve for 2 wheel brakes, which can be read off by adding the respective pressure changes from the pressure-volume curves of the wheel brakes. In particular in the event of front wheel and rear wheel pressure changes, different pressure-volume curves must be taken into account, since the pressure-volume curves differ greatly.

After Δt, the pressure of RB1 remains constant, i.e. the inlet valve and outlet valve of RB1 remain closed. During the next opening of the inlet valve EV of wheel brake cylinder 1 for time $Δt_t$ no increase in pressure in wheel brake cylinder RB 2 takes place either, i.e. the inlet valve of RB2 continues to remain closed. Here, the pressure increase $ΔP_2$ in the wheel brake cylinder RB2 corresponds to the volume displacement ΔV of the pressure supply DV. Before inlet valve EV2 opens for time $Δt_t$ the pre-pressure $P_{vor,MUX}$ is adapted via a corresponding volume displacement by the pressure supply DV to the pressure in the wheel brake cylinder RB1, so that when the inlet valve EV2 is opened for time $Δt_2$ the pre-pressure $P_{vor,MUX}$ does not drop. The noise developed during the pressure change in wheel brake cylinder RB1 is then very low. The increase in pressure $ΔP_2$ in wheel brake cylinder 1 can be determined directly from the correlation between the brake pressure change ΔP in the wheel brake cylinder and the volume change ΔV in the wheel brake cylinder RB 1 (see FIG. 4). The volume displacement ΔV can be determined directly from the piston displacement Δs of pressure supply DV (see further explanation according to FIG. 5). The piston displacement Δs is thus also a measure of the pressure change $\Delta P_2$ in wheel brake cylinder RB 1.

FIGS. 6 to 6b show various possibilities for connecting the valve circuit with the electrical pressure supply. The pressure supply DV can comprise a single piston, differential piston, double-stroke piston or positive displacement pump (e.g. geared pump), driven by an electric motor.

In FIG. 6, both brake circuits BK1 and BK2 are connected to the piston cylinder unit 20 or pressure supply unit DV. Here, the two brake circuits BK1 and BK2 can either be connected separately with the pressure supply DV or connected via a bypass valve BV for special functions, e.g. ABS pressure equalisation.

FIG. 6a shows a 2-circuit pressure supply, in which the brake circuits BK1 or BK2 can optionally be connected separately or jointly with isolation valve TV1 or isolation valve TV2.

Here also, the outputs of the pressure supply can be connected via a bypass-valve BV before isolation valves TV1 and TV2, which has safety advantages, since the isolation valves TV1 and TV2 separate the pressure supply DV from the brake circuits BK1 and BK2. As the pressure supply a 2-circuit pump or a double-stroke piston according to DE 10 2014 107 112 can be appropriate.

FIG. 6b shows a single-circuit pressure supply, connected via isolation valves TV1 and TV2 with the brake circuits BK1 and BK2.

The isolation valves in FIGS. 6a and 6b are primarily required in order to decouple the pressure generation unit from the main cylinder 2 in the event of a system failure, where there is no other mechanism to prevent the volume of the main cylinder being absorbed by the pressure supply unit during pedal operation.

In ABS control mode with the method described in particular when a pressure sensor is used, advantageously both brake circuits are connected via opened isolation valves.

All pressure supplies allow a defined pressure change via a defined volume control. Here also the change over time of the volume can be altered by different speeds, e.g. of the pressure supply piston, which has the potential for a reduction in pressure oscillations.

LIST OF REFERENCE NUMERALS

2 First piston cylinder unit
3 Path simulator
4 Operating device
5 Sensor device
6 Valve
8 Valve
10 Reservoir
12 Hydraulic line
14 Hydraulic line
16 Sensor
20 Pressure source, second piston cylinder unit
AV Outlet valve
EV Inlet valve
BK1 Hydraulic line, brake circuit
BK2 Hydraulic line, brake circuit
BV Bypass valve
DG Pressure sensor
HL1 Hydraulic line
HL2 Hydraulic line
RB1 Wheel brake
RB2 Wheel brake
RB3 Wheel brake
RB4 Wheel brake
T1 Isolation valve
T2 Isolation valve

What is claimed is:

1. An operating device for a vehicle brake system, the operating device including:
a control device,
two or more wheel brakes,
brake circuits,
a first piston cylinder unit, at least one working chamber of which is connected to at least one of the two or more wheel brakes via at least one first hydraulic line and a valve device that has at least normally open 2/2-way inlet valves and at least one outlet valve, and
a pressure source enabled to be controlled to supply a pressure medium to the at least one hydraulic line or to the at least one of the two or more wheel brakes connected to the at least one hydraulic line,
wherein the control device is configured to control pressure build-up via the inlet valves, wherein pressure build-up by the first piston cylinder unit and the pressure source in a respective one of the at least one of the two or more wheel brakes is performed via a respective one of the 2/2-way inlet valves, and wherein the control device is further configured to set or adjust respective pre-pressures at the two or more wheel brakes to respective levels based at least in part on respective coefficients of road friction at the two or more wheel brakes,
wherein an interior or armature chamber of the respective one of the 2/2-way inlet valves is connected to a corresponding one of the brake circuits via a second hydraulic line,
wherein a valve seat outlet of the respective one of the 2/2-way inlet valves is connected to the respective one of the at least one of the two or more wheel brakes via a third hydraulic line,
wherein pressure reduction in the respective one of the at least one of the two or more wheel brakes takes place via the respective one of the 2/2-way inlet valves associated with the respective one of the at least one of the at least one of the two or more wheel brakes, wherein the respective one of the 2/2-way inlet valves has only one valve seat and one plunger, whereby a magnetic armature moves the plunger so that the plunger comes up against the valve seat to close the valve seat outlet, and
wherein pressure build-up in the respective one of the at least one of the two or more wheel brakes takes place by means of a volume control as specified by the control device, wherein the pressure source is configured to adjust or provide a displacement volume of hydraulic medium to achieve a desired pressure change, and/or by means of time-controlled inlet valve opening simultaneously, with a time overlap, or one after the other, wherein the control device, for a complete pressure change in the respective wheel brake, is configured to open the respective one of the 2/2-way inlet valves at the start of a determined time period and to close the respective one of the 2/2-way inlet valves after the time period has elapsed.

2. The operating device according to claim 1, wherein in certain control situations due to different coefficients of road friction at the various ones of the two or more wheel brakes, where there is a pressure build-up in at least two of the two or more wheel brakes, the respective target pressures of which are at different levels, the control device, by means of the pressure source is configured to set or adjust the respective pre-pressures of the at least two of the two or more wheel brakes, wherein the pre-pressure for one of the at least two of the two or more wheel brakes is set or adjusted to a lower level than an actual pressure of at least one other wheel brake of the at least two of the two or more wheel brakes.

3. The operating device according to claim 1, wherein a return spring is configured to apply a force to a valve actuator in a direction of an opened position of the respective one of the 2/2-way inlet valves.

4. The operating device according to claim 3, wherein wheel brake pressure supports opening of the respective one of the 2/2-way inlet valves, in the event of failure of the supply voltage, wherein the respective one of the 2/2-way inlet valves is pushed open by the wheel brake pressure and the return spring.

5. The operating device according to claim 3, wherein the inlet valves are normally open valves, wherein hydraulic medium under pressure in the wheel brake associated with the respective one of the 2/2-way inlet valves applies a force to a movably mounted valve member disposed at the valve seat, which, in case of an emergency or in the event of a failure of the control device or the power supply, moves the valve member away from the valve seat and opens the respective one of the 2/2-way inlet valves.

6. The operating device according to claim 2, wherein the pre-pressure associated with the at least one of the at least two of the two or more wheel brakes supports a closing process of at least one of the 2/2-way inlet valve that is associated with the at least one of the at least two of the two or more wheel brakes.

7. The operating device according to claim 1, wherein the valve seat of the respective one of the 2/2-way inlet valves is a pressure-relieved valve seat or wherein the respective one of the 2/2-way inlet valves is designed with a corresponding return spring, which ensures that the respective one of the 2/2-way inlet valves is opened at maximum brake pressure in a corresponding wheel brake of the at least two wheel brakes.

8. The operating device according to claim 1, wherein a combination of volume control and timing control is provided for, wherein the volume control takes place by volume delivery and the timing control takes place according to a pressure differential between a wheel pressure and a pre-pressure corresponding to a wheel associated with the wheel pressure.

9. The operating device according to claim 1, wherein a time-variable control pre-pressure level for pressure changes is enabled to be set or adjusted by means of the pressure source, wherein a pre-pressure differential, defined as a difference between the pre-pressure and an actual pressure, for a particular one of the at least two wheel brakes undergoing pressure change, has a value less than or equal to 40 bar, and wherein a corresponding pressure differential between the control pre-pressure level and a wheel target pressure of a particular wheel is maintained at between 10 and 20 bar.

10. The operating device according to claim 1, wherein a pressure supply to the two or more wheel brakes takes place with a single circuit, wherein a working chamber of the pressure source that is able to be controlled is connected via isolation valves with the brake circuits.

11. The operating device according to claim 1, wherein the pressure source comprises at least one piston, differential piston, double-stroke piston or delivery pump, connected directly or via hydraulic elements with the reservoir.

12. The operating device according to claim 1, wherein volume control takes place in a variable manner over time.

13. The operating device according to claim 1, wherein the operating device further includes a brake pedal device, for the first piston cylinder unit.

14. A method of operating the operating device according to claim 1, the method comprising: maintaining a control pre-pressure of the pressure source at an actual wheel brake pressure in control mode at a level less than or equal to 150 bar.

15. The method according to claim 14, wherein the method further includes, in a multiplex case, releasing, under at least one fault condition, pressure contained at the at least one of the two or more wheel brakes using valves of the valve device without using additional non-return valves.

16. The method according to claim 14, further including dynamically adjusting, by a forward or return stroke of the piston of a pressure generating unit of the pressure source, the control pre-pressure, taking into consideration pressure-volume curves for the two or more wheel brakes; and
before pressure build-up of one of the two or more wheel brakes, setting a differential pressure, defined as a difference between the control pre-pressure and an actual pressure, for a particular one of the two or more wheel brakes undergoing pressure change, at less than or equal to 40 bar.

17. The operating device according to claim 1, wherein the control device is configured to control pressure build-up via a volume control and/or time control by means of the 2/2-way inlet valves.

18. The operating device according to claim 1, wherein the pressure reduction in the respective one of the at least one of the two or more wheel brakes takes place only via the respective 2/2-way inlet valve associated with the respective one of the at least one of the two or more wheel brakes.

19. The operating device according to claim 1, wherein the respective one of the 2/2-way inlet valves comprises a first inlet/outlet port and a second inlet/outlet port, wherein the second inlet/outlet port corresponds to the valve seat outlet, wherein the interior or armature housing of the respective one of the 2/2-way inlet valves is connected, through a first inlet/outlet port of the respective one of the 2/2-way inlet valves, via the second hydraulic line, to the pressure source, and wherein a second inlet/outlet port of the respective one of the 2/2-way inlet valves is connected to the respective one of the at least one of the wheel brakes, and wherein the respective one of the 2/2-way inlet valves is enabled to be opened both by a return spring thereof and by pressure in the respective one of the at least one of the two or more wheel brakes.

20. An operating device for a vehicle brake system, the operating device including:
a control device,
two or more wheel brakes,
brake circuits,
a first piston cylinder unit, at least one working chamber of which is connected to at least one of the two or more wheel brakes via at least one hydraulic line and a valve device that has at least normally open inlet valves, and
a pressure source enabled to be controlled to supply a pressure medium to the at least one hydraulic line or to the at least one of the two or more wheel brakes connected to the at least one hydraulic line,
wherein the control device is configured to control pressure build-up via a volume control and/or time control by means of the normally open inlet valves, and wherein the control device is further configured to set or adjust respective pre-pressures at the two or more wheel brakes to respective levels based at least in part on respective coefficients of road friction at the two or more wheel brakes, wherein an interior or armature chamber of a respective one of the normally open inlet valves is connected to a corresponding one of the brake circuits via a hydraulic line, wherein a valve seat outlet of the respective one of the normally open inlet valves is connected to a corresponding one of the two or more wheel brakes via a hydraulic line, wherein a pressure supply to the two or more wheel brakes takes place with a dual circuit, wherein two working chambers of the pressure source, which is controllable, are connected via isolation valves with the brake circuits, and wherein outputs of the pressure source are connected together via a bypass valve disposed before the isolation valves; and wherein pressure build-up in the at least one of the two or more wheel brakes takes place by means of a volume control as specified by the control device, wherein the pressure source is configured to adjust or provide a displacement volume of hydraulic medium to achieve a desired pressure change, and/or by means of time-controlled inlet valves opening simultaneously, with a time overlap, or one after the other, wherein the control device, for a complete pressure change in a respective one of the at least two wheel brakes, is configured to open the respective one of the normally open inlet valves at the start of a determined time period and to close the respective one of the normally open inlet valves after the time period has elapsed.

\* \* \* \* \*